US005692366A

United States Patent [19]
Hardesty

[11] Patent Number: 5,692,366
[45] Date of Patent: Dec. 2, 1997

[54] WALK-BEHIND MOWER REVERSE BELT TENSIONER

[75] Inventor: Terry Dean Hardesty, Columbus, Wis.

[73] Assignee: Deere & Company, Moline, Ill.

[21] Appl. No.: 572,342

[22] Filed: Dec. 14, 1995

[51] Int. Cl.$^6$ ...................................................... A01D 34/68
[52] U.S. Cl. ........................... 56/11.2; 56/11.6; 180/6.66; 180/19.3
[58] Field of Search ........................ 56/11.6, 11.2, 56/11.3, DIG. 4; 180/19.3, 19.1, 6.48, 6.66

[56] References Cited

U.S. PATENT DOCUMENTS

| 3,938,400 | 2/1976 | Konyla ............................ 180/6.66 X |
| 4,558,558 | 12/1985 | Horner, Jr. et al. .................. 56/11.6 X |
| 5,146,735 | 9/1992 | McDonner ........................... 56/11.6 X |

OTHER PUBLICATIONS

Scag Power Equipment, brochure entitled "Scag Power Equipment Commercial Mowers, Simply the Best", 12 pages, dated 1993, published in the U.S.A.

The Toro Company, brochure entitled "Toro Proline, Commercial Lawn–Care Equipment That Means Business", 20 pages, dated 1993, published in the U.S.A.

F. D. Kees Manufacturing Company, brochure entitled "Snapper Kees Pro Division Commercial Lawn & Turf Equipment", 10 pages, date unknown, published in the U.S.A.

*Primary Examiner*—Terry Lee Melius

[57] ABSTRACT

A belt drive tensioning device for a walk-behind mower having a power source, a transmission and shiftable between forward, neutral and reverse modes, right and left drive pulley's driven by the transmission, right and left drive belts driven by the drive pulleys, right and left ground engaging wheels driven by the drive belts, right and left idler pulleys shiftable into engagement against the drive belts for selectively placing drive tension in the drive belts, right and left biasing means for applying a force to the idler pulleys to bias the idler pulleys into engagement with the drive belts and place drive tension in said drive belts, right and left rods operatively coupled with the idler pulleys for shifting the idler pulleys toward and away from engagement with the drive belts, right and left pivotable levers coupled with the rods, the levers being independently engagable by the operator for pulling the respective rod and shifting the respective idler pulley in a direction away from engagement with the drive belt for executing a turn about the respective ground engaging wheel, a reverse bale arm operatively coupled with the rods, the bale arm being shiftable rearwardly by the operator for placing the rods in compression to press the idler pulleys against the drive belts with greater force when the transmission is in the reverse mode.

7 Claims, 4 Drawing Sheets

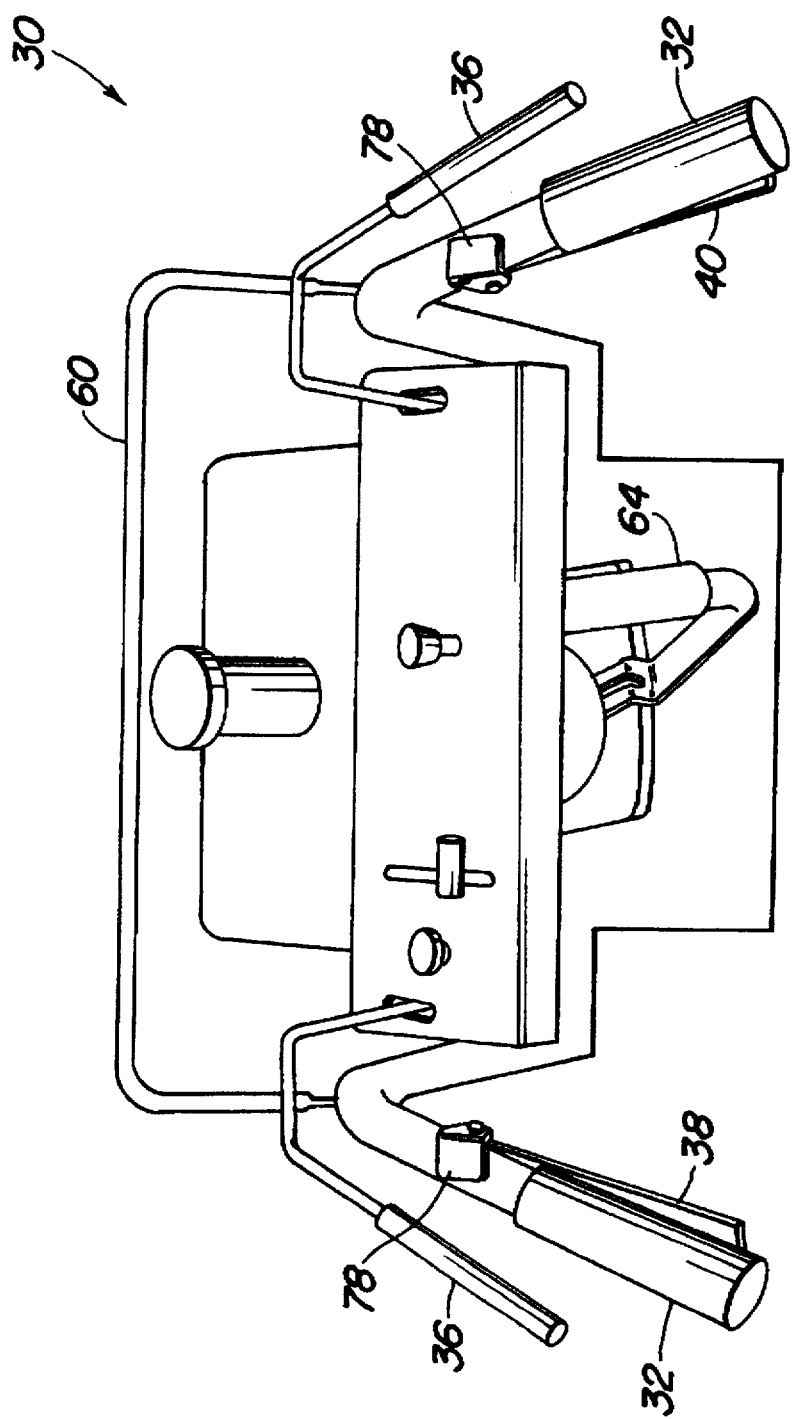

5,692,366

WALK-BEHIND MOWER REVERSE BELT TENSIONER

FIELD OF THE INVENTION

This invention relates to drive mechanisms for wide area walk-behind mowers which are belt driven.

BACKGROUND OF THE INVENTION

Wide area walk-behind mowers are typically used in commercial lawn care applications. Conventional commercial walk-behind mowers provide a power source such as an internal combustion engine, a transmission and right and left ground engaging driven wheels. An operator's station includes a pair of handles and a plurality of controls engageable by the operator. The controls allow the operator to place the mower in a forward or reverse mode, to steer the mower to the right or the left, and to stop the mower. Conventional walk-behind commercial mowers include right and left belt drive systems which extend between the transmission and the respective right and left driven wheels. Right and left idler pulleys are provided which place tension in the respective belts to drive the right and left wheels. The vehicle is steered by pivoting the right or left idler pulley out of engagement with the respective belt. For example, if the right idler pulley is pivoted away from the right drive belt, then the right wheel will no longer be driven by the power source, and the left wheel will continue to be driven. Therefore, the mower will execute a turn about the right wheel. Conventional commercial walk-behind mowers also include right and left brake mechanisms which are coupled with respective idler pulleys so that as the idler pulley is shifted away from the drive belt, the brake is applied to the respective wheel for causing the mower to execute even tighter turns about the slowed or braked wheel.

A first type of commercial walk-behind mower includes a pair of handles at the operator's station. Right and left handle levers are provided beneath each of the right and left handles. An operator presence bail arm is provided which is positioned generally above the right and left handles. The operator presence bail arm is operatively connected to the engine's ignition and transmission, and acts to prevent the engine from being started unless the bail arm is pressed downwardly against the handles. The operator must depress the operator presence bail arm before he can shift the mower's transmission from the neutral mode to the forward or reverse driven modes. A transmission lever is provided which is shiftable laterally by the knee or hand of the operator. With the transmission in its forward mode the mower begins travelling forwardly. To initiate a turn, the operator must pivot the left or right handle lever upwardly against the handle. A tension rod is positioned to extend between each handle lever and the respective idler pulley for causing the idler pulley to shift away from the drive belt as the handle lever is depressed, which causes the mower to execute a turn. If the handle lever is fully depressed against the handle, the respective brake linkage will be actuated and the respective wheel will also be braked in order to execute an even tighter turn.

When the mower is operating in the forward drive mode, the portion of the drive belt against which the idler pulley abuts is relatively slack. Therefore, only a relatively small force must be applied to the idler pulley to press the idler pulley against the drive belt sufficiently to place driving tension in the drive belt. A primary belt tensioning spring is typically provided for pressing the idler pulley against the drive belt with sufficient force to place the proper drive tension in the drive belt. When properly tensioned by the idler pulley, the belt does not slip relative to the drive pulley, and the mower will be propelled at full speed and drive force. Without proper drive tension in the belt, the belt will slip relative to the drive pulley and the mower will not be propelled with adequate force or speed. In the reverse drive mode the drive belt travels in the opposite direction, and the portion of the drive belt against which the idler pulley abuts is relatively tight and taut. Therefore, when the mower is placed in its reverse mode, a relatively large force must be applied to the idler pulley to press the idler pulley against the drive belt to place sufficient drive tension in the drive belt. In the reverse mode a force must be applied to the idler pulley that may be greater than is provided by the tension spring. Therefore, this first type of conventional commercial walk-behind mower provides a mechanism for placing additional force on the idler pulley for pressing the idler pulley against the drive belt with even greater force, as described below.

To initiate reverse driving mode, the operator of the first type of conventional commercial walk-behind mower uses his knee and/or hand to shift the transmission lever laterally to its reverse position. The mower may then begin creeping in the reverse direction, since the tension spring is biasing the idler pulley against the drive belt for providing drive tension in the drive belt. However, since the tension spring may not force the idler pulley against the drive pulley with great enough force to drive the mower with adequate speed and drive force in reverse, additional force must be applied to the idler pulley to increase the mower's drive force and speed in reverse. To do this, the operator can pull back on a reverse bail arm which is coupled with the idler pulley via a compression rod. As the operator pulls back on the reverse bail arm, the compression rod becomes compressed and presses the idler pulley further against the drive belt. Therefore, in the reverse mode the operator can place greater drive tension in the drive belt by pulling back on the reverse bail arm.

This type of conventional commercial walk-behind mower includes tension rods extending between the levers and the idler pulleys, and also compression rods which extend between the bail arm and the idler pulleys. This type of commercial walk-behind mower therefore tends to include a large number of parts which causes the mechanism to become relatively cluttered, and can also be relatively expensive to manufacture and assemble due to the large number of parts.

A second type of conventional commercial walk-behind mower provides a T-bar control lever engageable by the operator for controlling the operation of the mower. A pair of rods extend between respective idler pulleys and the outer ends of the T-bar. To initiate forward travel, the operator shifts the top bar of the T-shaped lever forwardly which shifts an idler pulley into engagement with the drive belt. This type of conventional commercial walk-behind mower does not provide a tension spring for biasing the idler pulley into driving engagement with the drive belt. Therefore, the operator must apply the required force to the idler pulley by pressing the top bar of the T-bar forwardly. To execute a turn, an operator releases either the left or right side of the top bar of the T-bar. This causes the rod on the released side of the T-bar to become decompressed and allows the idler pulley on that side to shift away from the respective drive belt and remove drive tension from that drive belt. The mower therefore executes a turn about the wheel whose idler pulley has been pivoted away from the drive belt.

In the reverse mode, the operator must shift the transmission to the reverse mode and pull backwardly on a lower bar portion of the T-bar lever. As he pulls backwardly on the lower bar, the rods again become compressed and shifts both idler pulleys against their respective drive belts for driving the mower in the reverse direction. To apply greater drive tension to the drive belts in reverse the operator must pull back on the lower bar portion with greater force.

This type of commercial walk-behind mower does not include a tension spring for biasing the idler pulley against the drive belts, and therefore, the operator must provide all the force for shifting the idler pulley against the drive belts during normal mowing operations. Therefore, the operator can easily become fatigued during periods of long operation, since he must supply all the force for pressing the idler pulleys against the drive belts in both the forward and reverse operating modes.

It would therefore be desirable to provide a commercial walk-behind mower having a belt drive system which can be steerable from the operator's station and which includes relatively few parts such that the mechanism is relatively inexpensive to manufacture and assemble. It would also be desirable for such a commercial walk-behind mower to provide a mechanism for allowing supplemental force to be applied to the idler pulley for pressing the idler pulley into operative engagement with the drive belts in the reverse drive mode. It would also be desirable for such a mechanism to eliminate the need for an operator to constantly manually apply drive tension to the mower's drive belts during normal mowing operations.

SUMMARY OF THE INVENTION

The present invention provides a mechanism for steering a wide area walk-behind mower and for driving said mower in the forward and reverse directions. The present invention includes a power source which drives a transmission having forward, neutral and reverse modes. The transmission drives right and left drive pulleys. Right and left belts are driven by the drive pulleys and serve to drive ground engaging right and left wheels. A spring biases an idler pulley against each belt to apply driving tension to the belt. Right and left rods are operatively coupled between the idler pulleys and right and left levers engagable by an operator. To execute a turn, the operator depresses the right or left lever, and the corresponding rod will pull the respective idler in a direction away from engagement with the belt. That belt will thereby lose drive tension, thus slowing the ground wheel on that side of the mower. The ground engaging wheel on the other side of the mower continues to be driven, and the mower executes a turn about the slowed wheel. If the operator depresses the lever further a brake linkage is accuated for applying a braking force to the wheel, and an even tighter turn is executed. When driving the mower in reverse, the belt is driven in the opposite direction, which causes the portion of the belt engaged by the idler pulley to become relatively tight. The biasing spring is not strong enough to place a large amount of driving tension in the belt in reverse. Therefore, when driving the mower in reverse the operator can pull rearwardly on a reverse bail arm to increase the drive tension in the belt. As the reverse bail arm pivots rearwardly, links extending between the reverse bail arm and the levers cause the levers to shift and place the rods in compression. This applies a force to the idler pulley and presses the idler pulleys against the belt such that greater drive tension is placed on the belt and higher speeds in reverse are attainable. Slots or lost motion means are defined in the reverse bail arm, and allow clearance for the levers to be independently engaged by the operator during the forward mode of travel.

The present invention thereby provides a mechanism for allowing a supplemental force to be applied to the idler pulley for pressing the idler pulley into operative engagement with the drive belts in the reverse drive mode. The present invention provides a mechanism adapted to place the rods in both tension and compression. The present invention therefore has a relatively low part count and is relatively simple in construction. Manufacturing and assembly costs are therefore relatively low. The present invention allows an operator to easily steer and operate the mower from an operator station, and includes a biasing mechanism which eliminates the need for the operator to constantly manually apply drive tension to the mower's drive belts during normal mowing operations.

BRIEF DESCRIPTION OF THE DRAWINGS

FIG. 4 is a perspective view of the operator's station of the walk behind mower vehicle according to the present invention.

DETAILED DESCRIPTION OF THE PREFERRED EMBODIMENT

Figure 1:
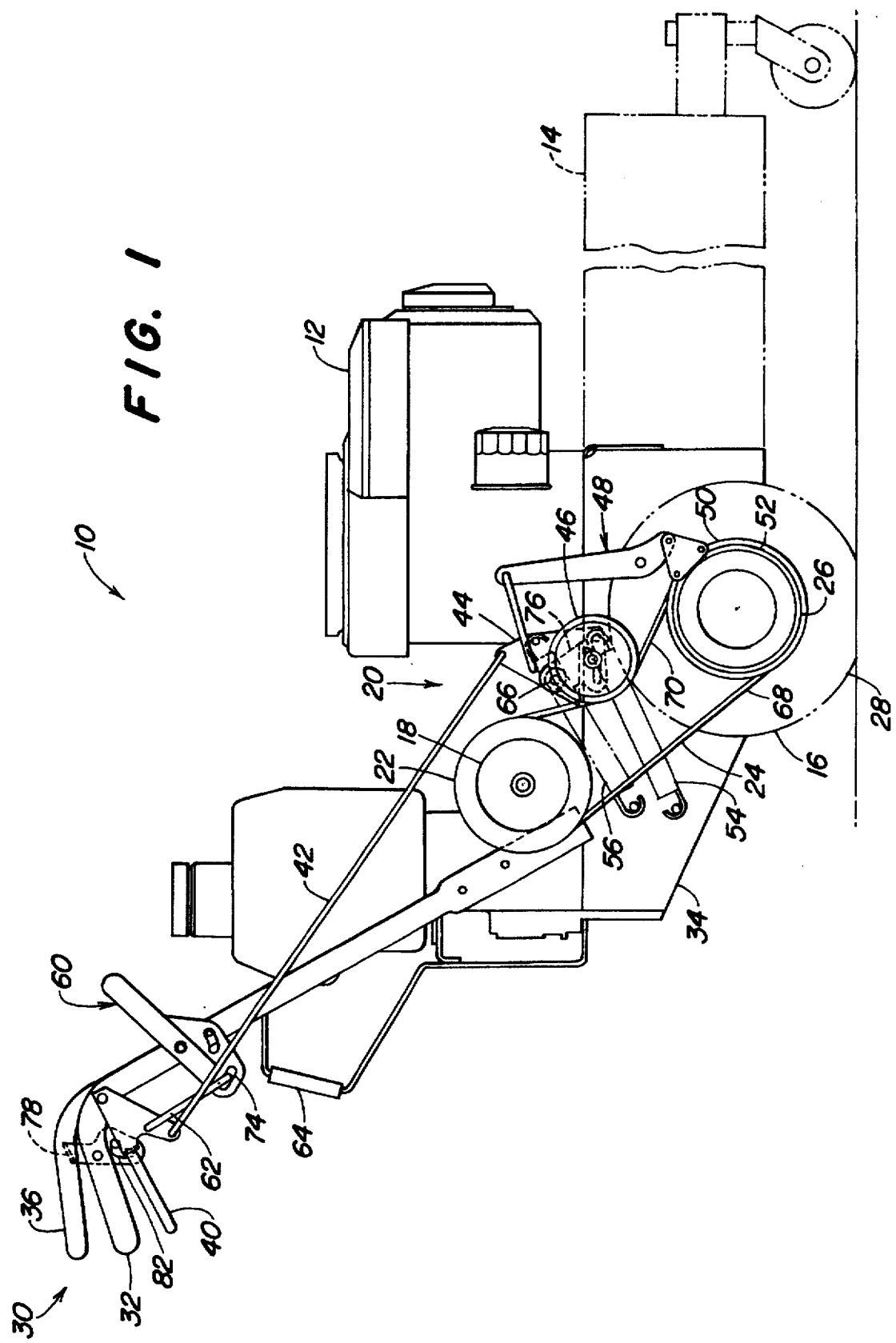
FIG. 1 is a side view of a walk-behind mowing vehicle showing the reverse belt tensioner mechanism according to the present invention shown in the neutral mode.
Figure 2:
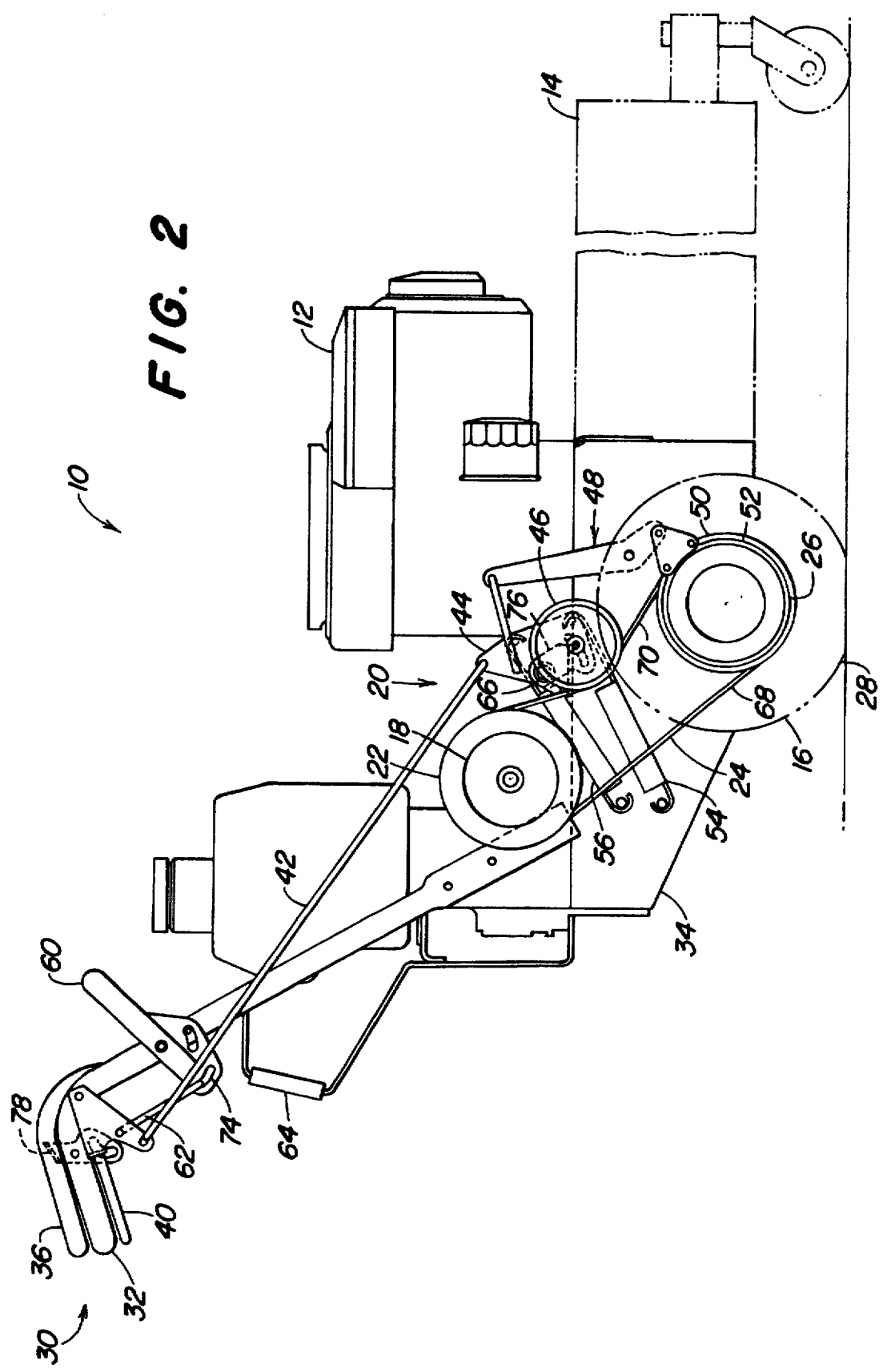
FIG. 2 is a side view of the mower of FIG. 1 shown with the reverse belt tensioner mechanism in the forward travel mode.
Figure 3:
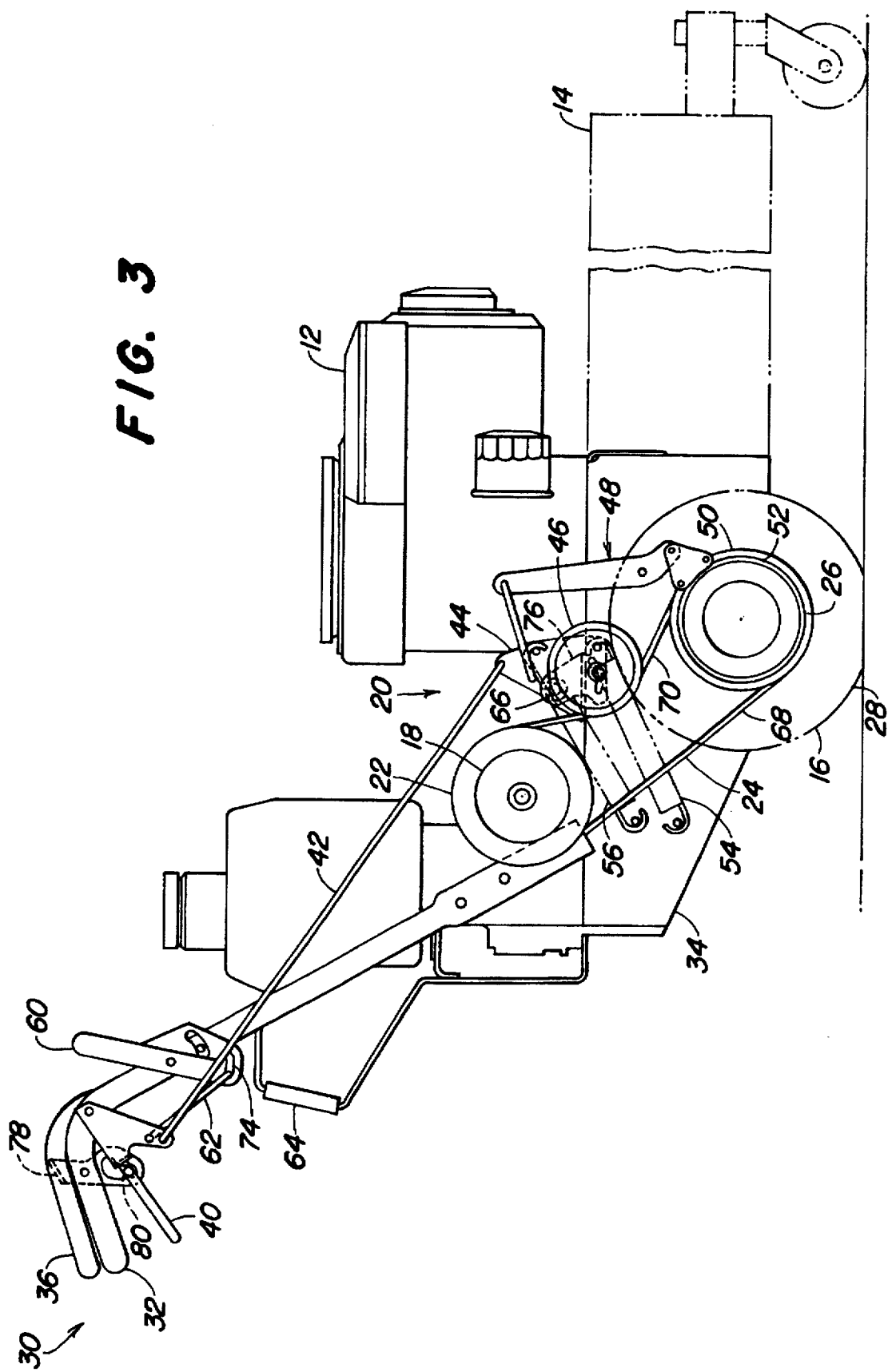
FIG. 3 is a side view of the mower of FIG. 1 shown with the reverse belt tensioner mechanism in the reverse travel mode.

Referring now to FIGS. 1 through 4, there is shown a commercial walk-behind mower 10 provided with the present invention. The mower 10 includes a power source 12 such as an internal combustion engine, a mower deck 14 within which grass and vegetation are cut, and right and left ground engaging drive wheels 16. The power source 12 is coupled with the drive wheels 16 via a transmission 18 shiftable between forward, neutral and reverse modes, and a pair of belt drive mechanisms 20. For the sake of clarity, only the drive mechanism on the right side of the vehicle 10 is shown in FIGS. 1 through 3, since the drive mechanisms on the right and left sides of the vehicle 10 are identical. The transmission 18 drives left and right drive pulleys 22 which drive respective left and right drive belts 24. Each drive belt 24 also engages a driven pulley 26 which is coupled for rotation with the same shaft as the respective ground-engaging wheel 28.

The commercial walk-behind mower 10 according to the present invention also includes an operator's station 30, as best seen in FIG. 4, which provides a plurality of handles and controls which allow the operator to control the operation of the mower 10. A pair of handles 32 extend upwardly and rearwardly from the frame 34 of the mower 10 and are engageable by the left and right hands of the operator. An operator presence bail arm 36 is pivotally mounted above the handles in the operator station 30, and is coupled with the engine's ignition via a cable or linkage (not shown). Left and right handle levers 38 and 40 are pivotally mounted beneath respective handles 32. As seen in FIGS. 1–3, left and right rods 42 extend between the respective handle levers 38 and 40 and left and right swing members 44. Left and right idler pulleys 46 are mounted to respective swing members 44. A brake linkage 48 is also coupled with the swing member 44 for braking the respective ground engaging wheel 28. The brake linkage 48 includes a brake band 50 which frictionally engages a brake drum 52 for applying braking force to the ground engaging wheel 28. First and second tension springs 54 and 56 are coupled with each swing member 44 and the frame 34 of the mower 10. A reverse bail arm 60, as seen in FIGS. 1-4 is mounted to the handles 32, and a pair of link members 62, as best shown in FIGS. 1-3, extend between the respective handle levers 38, 40 and the lower portions of the reverse bail arm 60.

Next, the operation of the present invention will be described in greater detail. After starting the engine 12 from the operator station with the transmission in neutral, the operator must then depress the operator presence 36 bail arm and shift the transmission 18 from the neutral mode to its forward mode. He does this by shifting the transmission lever 64 laterally from its central neutral position to a forward drive position. The mower 10 then begins forward travel. To execute a turn, the operator depresses the left or right handle lever 38 or 40. For example, to execute a right turn, the operator depresses the right handle lever 40 and the handle lever 40 will pivot upwardly and rearwardly, which shifts the right rod 42 upwardly and rearwardly. The right rod 42 is thereby placed in tension, which causes the right swing member 44 to pivot upwardly about its pivot axis 66, thus pulling the right idler pulley 46 in a direction away from the right drive belt 24. The right wheel 28 is thereby slowed due to the drive tension being removed from the belt 24 as the idler pulley 46 shifts away from the drive belt 24, and the mower 10 executes a turn to the right. If the operator continues to pivot the right handle lever 40 upwardly towards the right handle 32, as shown in FIG. 2, the right rod 42 will continue to shift rearwardly in tension and will shift the right swing member 44 and idler pulley 46 further in the direction away from the drive belt 24, and will engage the right brake linkage 48 to cause an even sharper turn to be executed to the right. When the operator wishes to cease execution of the right hand turn, he will release the right handle lever 40 and the biaser or first biasing spring 54 will pull the right idler pulley 46 back into engagement with the right drive belt 24, thereby causing driving tension to again be placed in the right drive belt 24. The mower 10 will then travel in a straight line.

When neither the left or right handle levers 38, 40 are engaged by the operator, the mower 10 travels in a straight forward direction. In this configuration, the rod 42 is in neither compression or tension. The first tension springs 54 bias the idler pulleys 46 into driving engagement with the drive belts 24 such that the operator is not required to apply any force to the controls during straight forward travel other than to depress the operator presence bail arm 36 against the handles 32. Operator fatigue is thereby minimized.

In the forward drive mode the right drive belt 24 is driven in a clockwise direction as shown in FIG. 2, and therefore the lower portion 68 of the drive belt 24 is relatively taut, and the drive belt's upper portion 70 is relatively slack. Therefore, the primary tension spring 54 can easily press the idler pulley 46 against the slack upper portion 70 of the drive belt 24 to place a sufficient amount of drive tension in the belt 24 to drive the mower 10 at full speed in the forward direction.

To operator the mower in the reverse direction, the operator must shift the transmission 18 to its reverse mode by shifting the transmission lever 64 laterally with his hand and/or knee to its reverse drive position. This initiates driving of the drive pulleys 22 in a reverse direction, which begins to drive the drive belt 24 in the counterclockwise direction as shown in FIG. 3. The biaser or primary tension springs 54 bias the right and left idler pulleys 46 into engagement with the drive belts 24 and tension is thereby placed in the drive belts 24. However, in the reverse mode, the drive belts 24 are driven in a counterclockwise direction by the drive pulley 22, which places the upper portion 70 of the drive belt 24 in relatively high tension, and the lower portion 68 of the drive belts 24 are more loose and slack. Therefore, a greater amount of force must be applied to the idler pulleys 46 than is supplied by the right and left primary tension springs 54 in order to apply sufficient drive tension to the belt 24 to drive the mower 10 in reverse with sufficiently drive force and speeds.

The present invention therefore provides a mechanism for pressing the idler pulleys 46 against the drive belt 24 with additional force in the reverse mode. The operator can pull rearwardly on the reverse bail arm 60 while he depresses the operator presence bail arm 36 and thereby apply a greater force to the idler pulleys 46, as described below. As the operator pulls the reverse bale arm 60 rearwardly to the position shown in FIG. 3, the lower portion of the reverse bail arm 60 pivots downwardly and forwardly, which causes ink members 62 to shift therewith. The link members 62 pull downwardly on the handle levers 38 and 40, which in turn causes the rods 42 to compress and shift downwardly and forwardly. This downward and forward shifting of the rods 42 serves to further swing the swing members 44 and idler pulleys 46 about their pivot axes 66. The idler pulley 46 is thereby pressed against the drive belt 24 with greater force. The present invention therefore allows the operator to place additional drive tension in the drive belt 24 when operating in the reverse mode such that sufficiently high reverse travel speeds can be achieved.

Slots or lost motion means 74 are formed in the reverse bale arm 60 on the lower portion thereof. The slots 74 receive the end portions of the right and left link members 62. When in the forward mode, the slots 74 allow clearance for the right or left links 62 to independently shift upwardly with the respective handle lever 38 or 40 during execution of a turn. The slots therefore allow the handle levers 38 or 40 to be depressed one at a time during execution of a turn.

The primary tensioning spring 54 is provided for biasing the idler pulley 46 toward engagement with the drive belt 24. The secondary spring 56 also extends between the swing member 44 and the frame 34 of the mower 10 and assists the operator in holding the lever 38 or 40 depressed during execution of a turn. When the mower 10 is traveling straight forward, the secondary spring 56 is generally aligned with the pivot axis 66 of the swing member 44, and therefore will apply only a negligible force to the swing member 44. However, when the operator presses up on the lever 38, the swing member 44 pivots to the position shown in FIG. 2, and the secondary spring 56 now is positioned to one side of the swing member's pivot axis 66. Therefore, as the operator depressed the lever 38 the secondary spring 56 will assist him in pivoting the swing member 44 in a direction away from engagement with the drive belt 24 and against the force of the primary spring 54. As the operator continues to depress the lever 38 further, the secondary spring 56 becomes more misaligned with the swing member's pivot axis 66 and thereby applies a greater force to the swing member 44. Therefore, as the operator pivots the lever 38 upwardly he will find it increasingly easier to press and hold the lever 38 in an upward position.

The idler pulley 46 is mounted to swing member 44, which is pivotally mounted to mounting plate 76 which is rigidly fixed to the mower frame 34. The position of the idler pulley 46 relative to the swing member 44 can be adjusted by shifting the idler pulley 46 within a slot defined in the swing member 44. By shifting the position of the idler pulley 46 within the slot, the operator can adjust the drive tension that is applied to the drive belt 24 by the idler pulley 46 during normal forward travel.

A pair of parking brake levers 78 are pivotably mounted in the operator station 30 adjacent respective left and right levers 38 and 40. Pin members 80 mounted with the levers 38 and 40 are positioned within slots 82 formed in the parking brake levers 78. To apply the parking brake feature the operator depresses both levers 38 and 40 upwardly and pivots the parking brake levers 78 rearwardly. The levers 38 and 40 can then be released, and the pin members 80 will be held in an upward position by the slot 82 such that the levers 38 and 40 are held upwardly. When the levers 38 and 40 are held in this position driving tension is released from the drive belts 24 and the brakes 48 are applied to the ground engaging wheels 28. To release the parking brake feature the operator presses the levers 38 and 40 upwardly and pivots the parking brake levers 78 forwardly.

I claim:

1. A belt tensioning mechanism for a walk-behind vehicle, comprising:

a power source, right and left belts operatively driven by the power source, right and left ground engaging wheels operatively driven by the respective belts, right and left idler pulleys for applying drive tension to the respective belts, right and left biaser operatively coupled with respective idler pulleys for pressing and biasing respective idler pulleys against respective belts for applying drive tension to respective belts, and left and right rods operatively extending between an operator station and respective idler pulleys, said rods being shiftable in a first direction for shifting respective idler pulleys in a direction away from engagement with respective belts, and said rods are shiftable by the operator in a second direction opposite to the first direction for pressing respective idler pulleys against respective belts with force in addition to the force applied by the respective biaser.

2. The invention of claim 1, wherein the rods are in tension to shift respective idler pulleys in the first direction and are in compression to shift respective idler pulleys in the second direction.

3. The invention of claim 2, wherein said vehicle is in a neutral drive mode when the rods shift in the first direction and is in a reverse drive mode when the rods shift in the second direction.

4. A belt drive tensioning device for a walk-behind vehicle, comprising:

a power source, a transmission driven by said power source and shiftable between forward, neutral and reverse modes, right and left drive pulley's driven by said transmission, right and left drive belts driven by respective drive pulleys, right and left ground engaging wheels driven by respective drive belts, right and left idler pulleys shiftable into engagement against respective drive belts for selectively placing drive tension in respective drive belts, right and left biaser for applying a force to the respective idler pulleys for biasing respective idler pulleys into engagement with respective drive belts for placing drive tension in said respective drive belts, right and left rods operatively coupled with respective idler pulleys for shifting said respective idler pulleys toward and away from engagement with respective drive belts, right and left pivotable levers coupled with respective rods, said levers being independently engagable by the operator for pulling the respective rod and shifting the respective idler pulley in a direction away from engagement with the respective drive belt for executing a turn about the respective ground engaging wheel, and a reverse bale arm operatively coupled with the rods, said bale arm being shiftable rearwardly by the operator for placing the rods in compression to press the idler pulleys against the drive belts with force in addition to the force applied by the biaser when the transmission is in the reverse mode.

5. The invention of claim 4, wherein said reverse bale arm is operatively occupied with the levers for shifting the levers in a direction that will place the rods in compression when the reverse bale arm is pulled rearwardly by the operator.

6. The invention of claim 5, and further comprising lost motion means defined between said reverse bale arm and each of said levers for allowing said levers to be actuated independently to execute turns when the transmission is in a forward drive mode.

7. The invention of claim 4, and further comprising right and left springs operatively coupled with respective idler pulleys for biasing respective idler pulleys into engagement with the respective drive belt.

\* \* \* \* \*

UNITED STATES PATENT AND TRADEMARK OFFICE
CERTIFICATE OF CORRECTION

PATENT NO.  : 5,692,366
DATED       : 2 December 1997
INVENTOR(S) : Terry Dean Hardesty It is certified that error appears in the above-indentified patent and that said Letters Patent is hereby corrected as shown below:

Claim 5, Column 8, line 2, delete "occupied" and insert - - coupled - - .

Signed and Sealed this

Twenty-third Day of June, 1998

Attest:

Attesting Officer

BRUCE LEHMAN

Commissioner of Patents and Trademarks